(12) United States Patent
Chen et al.

(10) Patent No.: US 9,008,421 B2
(45) Date of Patent: Apr. 14, 2015

(54) IMAGE PROCESSING APPARATUS FOR PERFORMING COLOR INTERPOLATION UPON CAPTURED IMAGES AND RELATED METHOD THEREOF

(71) Applicant: Realtek Semiconductor Corp., HsinChu (TW)

(72) Inventors: Shih-Tse Chen, Hsinchu County (TW); Wen-Tsung Huang, Chiayi (TW)

(73) Assignee: Realtek Semiconductor Corp., Science Park, Hsin-Chu (TW)

( * ) Notice: Subject to any disclaimer, the term of this patent is extended or adjusted under 35 U.S.C. 154(b) by 0 days.

(21) Appl. No.: 14/148,676

(22) Filed: Jan. 6, 2014

(65) Prior Publication Data
US 2014/0198985 A1    Jul. 17, 2014

(30) Foreign Application Priority Data
Jan. 17, 2013    (TW) .............. 102101779 A (51) Int. Cl.
*G06K 9/00* (2006.01)
*G06T 5/20* (2006.01)
*G06T 7/00* (2006.01)

(52) U.S. Cl.
CPC .............. *G06T 5/20* (2013.01); *G06T 7/0085* (2013.01)

(58) Field of Classification Search
USPC ......... 382/167, 162, 266, 284, 302, 118, 154, 382/300; 345/156, 157, 158, 422, 656, 592, 345/629; 348/744, 746, 750, 27; 340/5.83; 358/1.9; 375/240, 240.03, 240.2, 375/240.01; 715/202
See application file for complete search history.

(56) References Cited

U.S. PATENT DOCUMENTS

| | | | | |
|---|---|---|---|---|
| 7,668,402 B2* | 2/2010 | Grindstaff et al. | ............ | 382/284 |
| 7,995,649 B2* | 8/2011 | Zuo et al. | ................ | 375/240.03 |
| 8,050,519 B2* | 11/2011 | Katsumata et al. | ........... | 382/284 |
| 8,144,123 B2* | 3/2012 | Denoue et al. | ................ | 345/157 |
| 8,295,648 B2* | 10/2012 | Dohta | ........................... | 382/302 |

\* cited by examiner

*Primary Examiner* — Anh Do
(74) *Attorney, Agent, or Firm* — Winston Hsu; Scott Margo (57) ABSTRACT

An image processing method includes: receiving image data from a frame buffer, wherein each pixel of the image data has only one color information; estimating four second color information corresponding to up, down, left, and right sides of the target pixel respectively according to a first color information of the target pixel per se and color information of the neighboring pixels for a target pixel of the image data; calculating four color difference gradients corresponding to up, down, left, and right sides of the target pixel respectively according to the four second color information of the target pixel; determining an edge texture characteristic of the target pixel according to the four color difference gradients of the target pixel; and determining whether to modify the bit value of the first color information of the target pixel stored in a frame buffer according to an edge texture characteristic of the target pixel.

20 Claims, 9 Drawing Sheets

|  | j-4 | j-3 | j-2 | j-1 | j | j+1 | j+2 | j+3 | j+4 |
|---|---|---|---|---|---|---|---|---|---|
| i-4 | R | G | R | G | R | G | R | G | R |
| i-3 | G | B | G | B | G | B | G | B | G |
| i-2 | R | G | R | G | R | G | R | G | R |
| i-1 | G | B | G | B | G | B | G | B | G |
| i   | R | G | R | G | R | G | R | G | R |
| i+1 | G | B | G | B | G | B | G | B | G |
| i+2 | R | G | R | G | R | G | R | G | R |
| i+3 | G | B | G | B | G | B | G | B | G |
| i+4 | R | G | R | G | R | G | R | G | R |

FIG. 3

|  | j-2 | j-1 | j | j+1 | j+2 |
|---|---|---|---|---|---|
| i-2 | R | $\hat{B}^T$ / G | $\hat{G}^T$ / R | $\hat{B}^T$ / G | R |
| i-1 | G | $\hat{G}^T$ / B | $\hat{R}^T$ / G | $\hat{G}^T$ / B | G |
| i | R | $\hat{B}^T$ / G | $\hat{G}^T$ / R | $\hat{B}^T$ / G | R |
| i+1 | G | B | G | B | G |
| i+2 | R | G | R | G | R |

|  | j−2 | j−1 | j | j+1 | j+2 |
|---|---|---|---|---|---|
| i−2 | R | G | R | G | R |
| i−1 | G | B | G | B | G |
| i | R | $\hat{B}^B$ G | $\hat{G}^B$ R | $\hat{B}^B$ G | R |
| i+1 | G | $\hat{G}^B$ B | $\hat{R}^B$ G | $\hat{G}^B$ B | G |
| i+2 | R | $\hat{B}^B$ G | $\hat{G}^B$ R | $\hat{B}^B$ G | R |

|  | j-2 | j-1 | j | j+1 | j+2 |
|---|---|---|---|---|---|
| i-2 | R | G | R | G | R |
| i-1 | $\hat{B}^L$ / G | $\hat{G}^L$ / B | $\hat{B}^L$ / G | B | G |
| i | $\hat{G}^L$ / R | $\hat{R}^L$ / G | $\hat{G}^L$ / R | G | R |
| i+1 | $\hat{B}^L$ / G | $\hat{G}^L$ / B | $\hat{B}^L$ / G | B | G |
| i+2 | R | G | R | G | R |

|  | j-2 | j-1 | j | j+1 | j+2 |
|---|---|---|---|---|---|
| i-2 | R | G | R | G | R |
| i-1 | G | B | $\hat{B}^R$ / G | $\hat{G}^R$ / B | $\hat{B}^R$ / G |
| i | R | G | $\hat{G}^R$ / R | $\hat{R}^R$ / G | $\hat{G}^R$ / R |
| i+1 | G | B | $\hat{B}^R$ / G | $\hat{G}^R$ / B | $\hat{B}^R$ / G |
| i+2 | R | G | R | G | R |

|  | j−3 | j−2 | j−1 | j | j+1 | j+2 | j+3 |
|---|---|---|---|---|---|---|---|
| i−3 | B | G | B | G | B | G | B |
| i−2 | G | R | G | R | G | R | G |
| i−1 | B | G | B | G | B | G | B |
| i | G | R | G | R | G | R | G |
| i+1 | B | G | B | G | B | G | B |
| i+2 | G | R | G | R | G | R | G |
| i+3 | B | G | B | G | B | G | B |

IMAGE PROCESSING APPARATUS FOR PERFORMING COLOR INTERPOLATION UPON CAPTURED IMAGES AND RELATED METHOD THEREOF

BACKGROUND OF THE INVENTION

1. Field of the Invention

The disclosed embodiments of the present invention relate to an image processing method, and more particularly, to a method for performing color interpolation upon images captured by an image sensor and related image processing apparatus thereof.

2. Description of the Prior Art

In any consumer electronic product using a single image sensor to capture images (e.g., a digital camera, a video camera, a multimedia mobile phone, a surveillance system, a video phone, etc.), the image sensor records red, green and blue color information through the Bayer color filter array covered on the single image sensor, wherein the image sensor only records one color intensity value for each pixel location to reduce the manufacturing cost. Further, in order to restore a raw Bayer CFA image captured by the single image sensor to a full-color image, there is a need for a color interpolation process to obtain the missing color data. Since the color interpolation algorithm includes analysis of the structure and color of the image content, it has a great impact on the image quality of the final output.

In the field of IC designs, color interpolation usually occupies a lot of space of line buffers, and the computational complexity of the color interpolation is relatively high. Therefore, how to reduce the manufacturing cost under the premise of effectively preventing distortion, including zipper effects, color aliasing, Moire pattern and false color, from emerging on object boundaries and texture regions of the image has become an issue to be addressed in this field. In addition, Taiwanese Patent Publication No. 1274908 discloses using a pre-calculated minimum square error (MSE) to estimate the weighting factors of the color pixel values of the neighboring pixels to be used. Besides, another technique disclosed in Taiwanese Patent Publication No. 1296482 is to detect image edges on a plurality of interpolation directions for a target pixel and generate a plurality of image edge gradients, and then estimate the missing color ingredients of the target pixel according to a sum of normalized random adjustment factors. However, the above techniques require a larger memory buffer and a considerable number of division operations, thus leading to an increased manufacturing cost and making the hardware implementation not easy to realize. As a result, the practicality of these techniques is reduced. Furthermore, the above-mentioned color interpolation method refers to excessive direction information, and thus introduces the blurring effect and reconstruction distortion to image areas of sharp edges and fine structures easily, which reduces the image quality.

SUMMARY OF THE INVENTION

Thus, one of the objectives of the present invention is to provide an image processing method which can output high quality images without expensive hardware for extra buffer space and complicated operations like multiplication and division operations, to solve the problem mentioned above.

According to a first embodiment of the present invention, an image processing apparatus is disclosed. The image processing apparatus includes an initial interpolation unit, a color difference gradient estimating unit, an edge texture characteristic determining unit, and an edge indication factor recording unit. The initial interpolation unit is arranged for receiving image data from a frame buffer, wherein each pixel of the image data has only one color information, and the initial interpolation unit estimates four second color information corresponding to up, down, left, and right sides of the target pixel respectively according to a first color information of the target pixel and color information of neighboring pixels for a target pixel of the image data, wherein the color corresponding to the first color information is different from the colors corresponding to the four second color information. The color difference gradient estimating unit, coupled to the initial interpolation unit, arranged for calculating four color difference gradients corresponding to up, down, left, and right sides of the target pixel respectively according to the four second color information of the target pixel. The edge texture characteristic determining unit, coupled to the color difference gradient estimating unit, arranged for determining an edge texture characteristic of the target pixel according to the four color difference gradients of the target pixel. The edge indication factor recording unit, coupled to the edge texture characteristic determining unit, arranged for determining whether to modify the bit value of the first color information of the target pixel stored in a frame buffer according to an edge texture characteristic of the target pixel.

According to a second embodiment of the present invention, an image processing method is disclosed. The image processing method includes: receiving image data from a frame buffer, wherein each pixel of the image data has only one color information; estimating four second color information corresponding to up, down, left, and right sides of the target pixel respectively according to a first color information of the target pixel per se and color information of the neighboring pixels for a target pixel of the image data, wherein the color corresponding to the first color information is different from the colors corresponding to the four second color information; calculating four color difference gradients corresponding to up, down, left, and right sides of the target pixel respectively according to the four second color information of the target pixel; determining an edge texture characteristic of the target pixel according to the four color difference gradients of the target pixel; and determining whether to modify the bit value of the first color information of the target pixel stored in a frame buffer according to an edge texture characteristic of the target pixel.

According to a third embodiment of the present invention, an image processing apparatus is disclosed. The image processing apparatus includes an initial interpolation unit, a color difference gradient estimating unit, an edge texture characteristic determining unit, a dynamic weighting factor quantization allocating unit, and a weighted interpolation unit. The initial interpolation unit, arranged for receiving image data from a frame buffer, wherein each pixel of the image data has only one color information, and the initial interpolation unit estimates four second color information corresponding to up, down, left, and right sides of the target pixel respectively according to a first color information of the target pixel and color information of neighboring pixels for a target pixel of the image data, wherein the color corresponding to the first color information is different from the colors corresponding to the four second color information. The color difference gradient estimating unit, coupled to the initial interpolation unit, arranged for calculating four color difference gradients corresponding to up, down, left, and right sides of the target pixel respectively according to the four second color information of the target pixel . The edge texture characteristic determining unit, coupled to the color difference gradient estimating unit, arranged for determining an edge texture characteristic of the target pixel according to the four color difference gradients of the target pixel. The dynamic weighting factor quantization allocating unit, coupled to the color difference gradient estimating unit and the edge texture characteristic determining unit, arranged for determining a plurality of weighs according to the four color difference gradients of the target pixel and the edge texture characteristic of the target pixel by using a look-up table. The weighted interpolation unit, coupled to the initial interpolation unit and the dynamic weighting factor quantization allocating unit, arranged for performing the weighting addition upon at least two of the four second color information of the target pixel by using the weighting factors to generate a target second color information of the target pixel.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Figure 1:
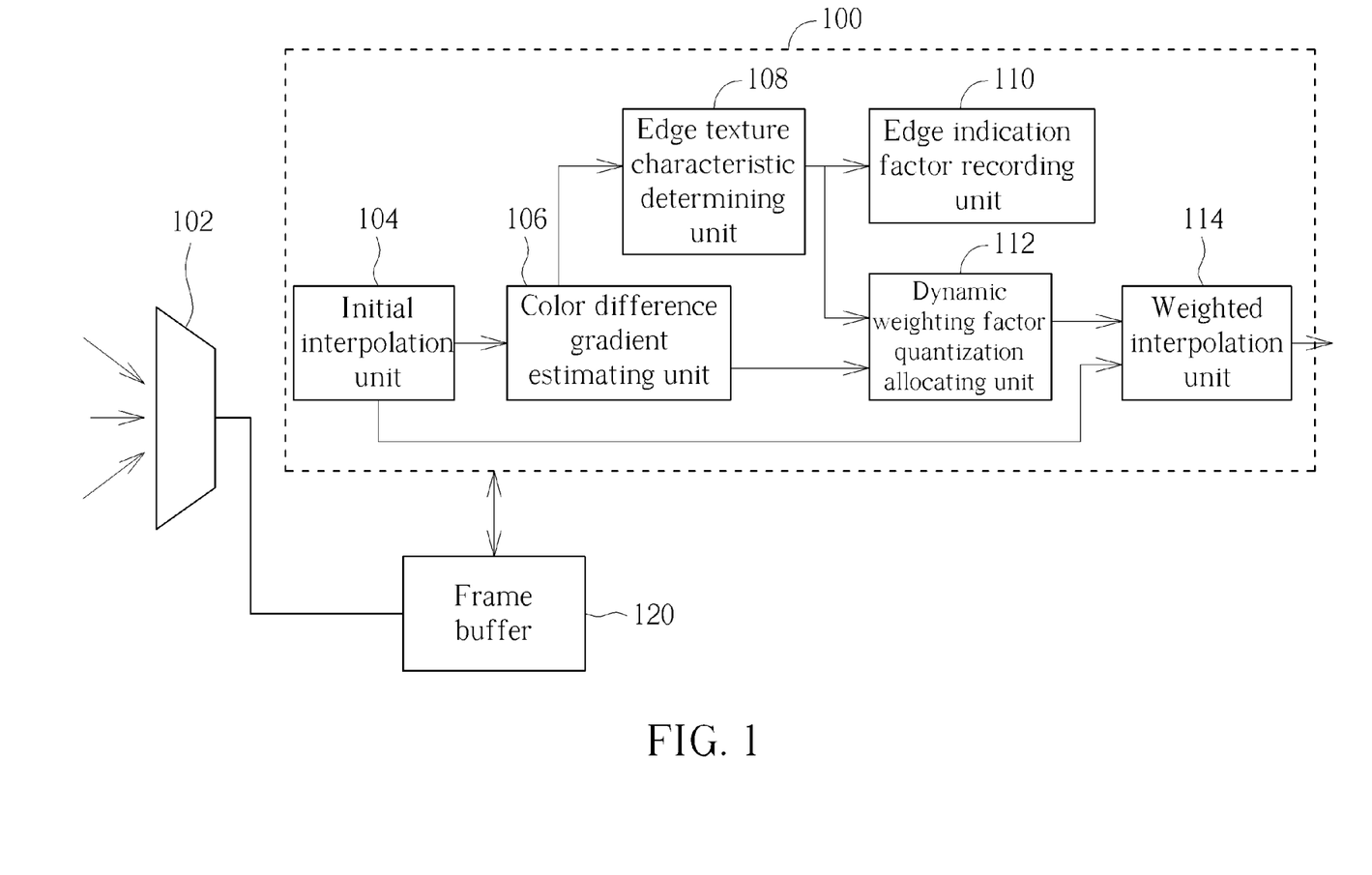
FIG. 1 is a diagram illustrating an image processing apparatus according to an exemplary embodiment of the present invention.

Please refer to FIG. 1, which is a diagram illustrating an image processing apparatus 100 according to an exemplary embodiment of the present invention. As shown in FIG. 1, the image processing apparatus 100 is coupled to an image sensor 102 and a frame buffer 120, and includes an initial interpolation unit 104, a color difference gradient estimating unit 106, an edge texture characteristic determining unit 108, an edge indication factor recording unit 110, a dynamic weighting factor quantization allocating unit 112, and a weighted interpolation unit 114. The image sensor 102 is a single image sensor covered by the Bayer color filter array. That is to say, each pixel captured by the image sensor 102 has only one color information (e.g., red color information, blue color information, or green color information). In addition, the image processing apparatus 100 may be employed in any electronic apparatus using a single image sensor, such as a digital camera, a video camera, a multimedia mobile phone, a surveillance system, a video phone, etc.

Figure 2:
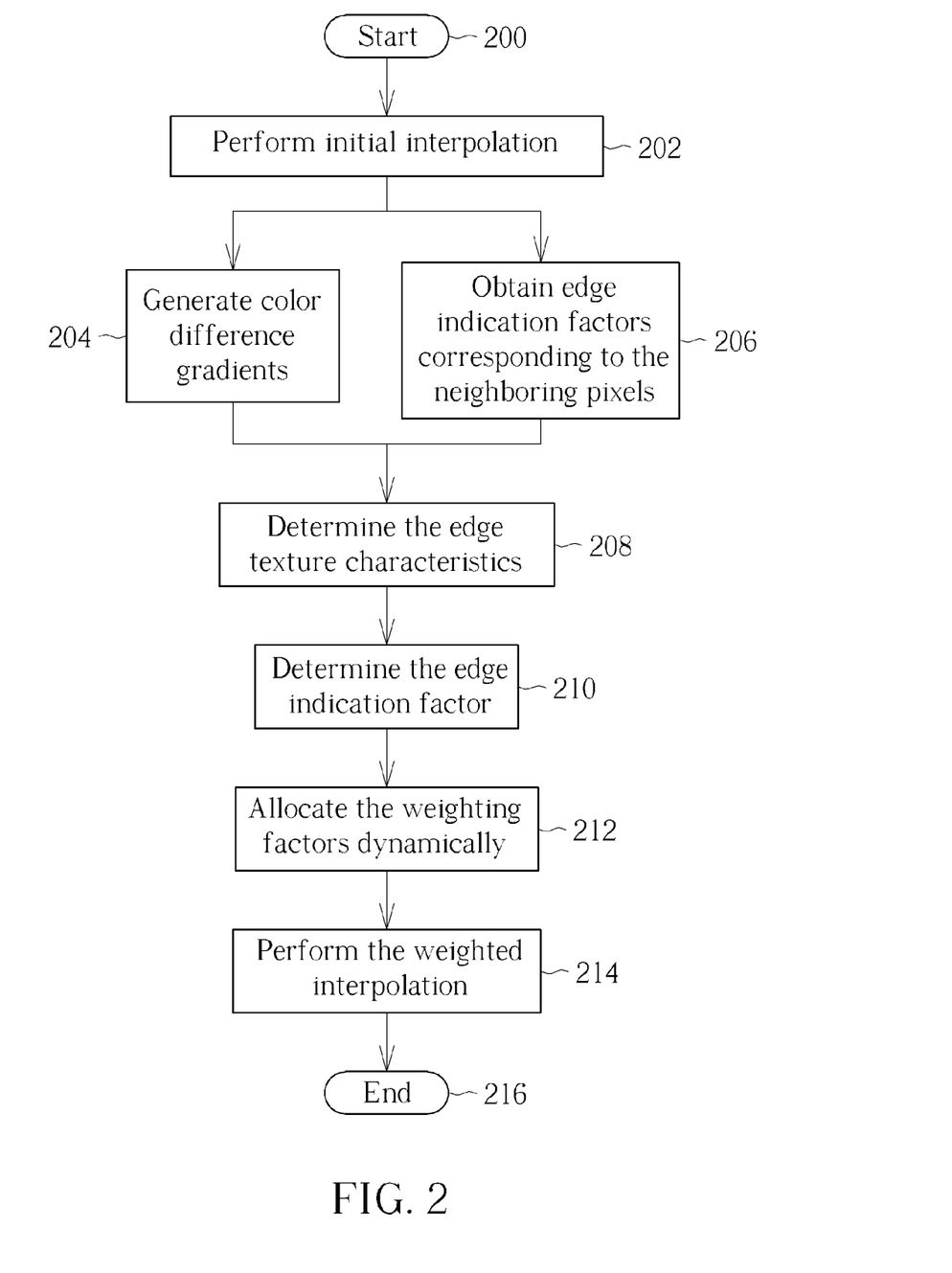
FIG. 2 is a flowchart illustrating an image processing method according to an exemplary embodiment of the present invention.

Please refer to FIG. 2 in conjunction with FIG. 1. FIG. 2 is a flowchart illustrating an image processing method according to an exemplary embodiment of the present invention. Provided that substantially the same result is achieved, the steps of the flowchart shown in FIG. 2 need not be in the exact order shown and need not be contiguous, that is, other steps can be intermediate. Besides, some steps in FIG. 2 may be omitted according to various embodiments or requirements. The method may be summarized as follows.

Figure 3:
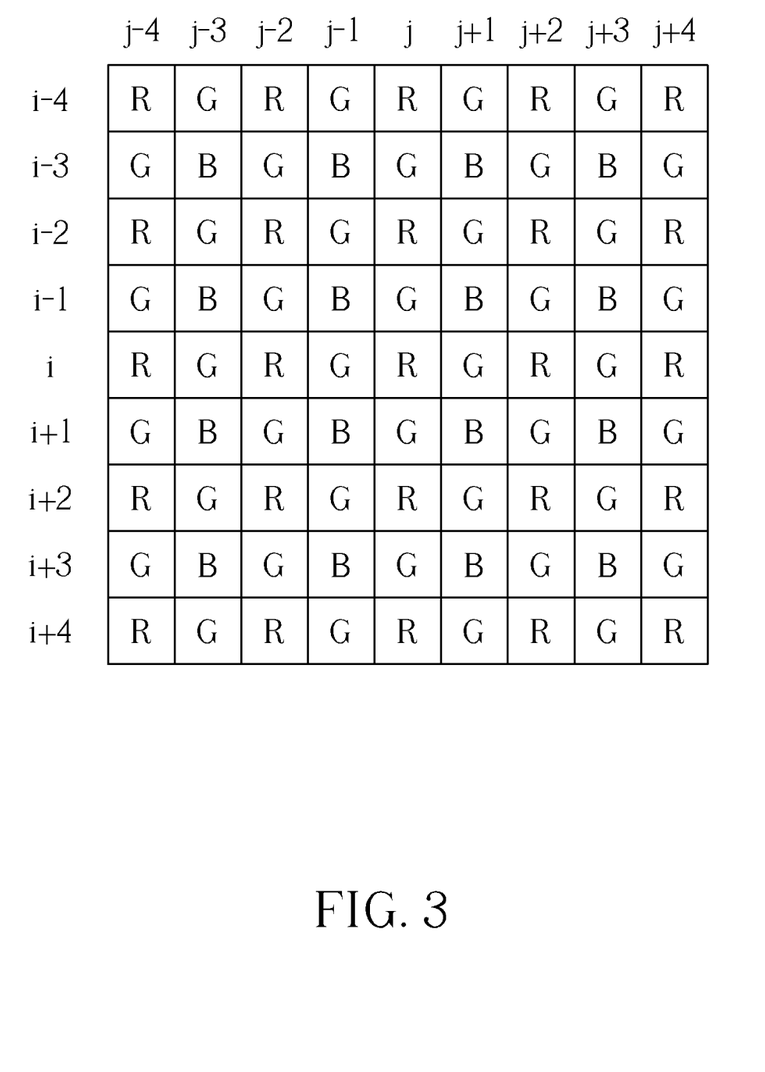
FIG. 3 is a diagram illustrating a Bayer CFA image.

In step 200, the flow starts, and the image sensor 102 generates an image data and stores it in the frame buffer 120 temporarily, wherein the image data is a Bayer CFA image. A portion of the image data is illustrated in FIG. 3, where each pixel has only one color data. Therefore, the pixels labeled "R" in FIG. 3 are representative of pixels each including only red color information and having no blue and green information; the pixels labeled "B" in FIG. 3 are representative of pixels each including only blue color information and having no red and green information; and the pixels labeled "G" in FIG. 3 are representative of pixels each including only red green information and having no red and blue information.

In step 202, the initial interpolation unit 104 performs initial interpolation upon the received image data. The initial interpolation unit 104 would estimate the green color information for four directions of red and blue pixels, and also estimate the red and blue color information for four directions of green pixels. In details, referring to the portion of the image data shown in FIG. 3, it is assumed that i and j are representative of the row and column of the current position, and the target pixel under processing would be located at (i, j). For convenience, c(i,j) mentioned hereinafter represents the original pixel color, and ĉ(i,j) mentioned hereinafter represents the estimated pixel color, wherein c may be R, G or B. Then, the estimated green color information of red pixels may be obtained by using the following equations (1.1)~(1.4).

$$\hat{G}^T(i,j) = G(i-1,j) + (R(i,j) - R(i-2,j))/2 + (G(i+1,j) - 2G(i-1,j) + G(i-3,j))/8 \quad (1.1)$$

$$\hat{G}^B(i,j) = G(i+1,j) + (R(i,j) - R(i+2,j))/2 + (G(i-1,j) - 2G(i+1,j) + G(i+3,j))/8 \quad (1.2)$$

$$\hat{G}^L(i,j) = G(i,j-1) + (R(i,j) - R(i,j-2))/2 + (G(i,j+1) - 2G(i,j-1) + G(i,j-3))/8 \quad (1.3)$$

$$\hat{G}^R(i,j) = G(i,j+1) + (R(i,j) - R(i,j+2))/2 + (G(i,j-1) - 2G(i,j+1) + G(i,j+3))/8 \quad (1.4)$$

The superscripts L, R, T, and B represent four directions, i.e., up, down, left, and right. Then, after the green color information of the red pixels is obtained, the red information of green pixels may be obtained by utilizing the green color information of the red pixels estimated by the above equations. The estimated red color information of the green pixels may be obtained by using the following equations (2.1)~(2.4), where the target pixel is assumed to be a green pixel G(i, j).

$$\hat{R}^T(i,j)=R(i-1,j)+(G(i,j)-\hat{G}^T(i-1,j)); \quad (2.1)$$

$$\hat{G}^B(i,j)=R(i+1,j)+(G(i,j)-\hat{G}^B(i+1,j)); \quad (2.2)$$

$$\hat{R}^L(i,j)=R(i,j-1)+(G(i,j)-\hat{G}^L(i,j-1)); \quad (2.3)$$

$$\hat{R}^R(i,j)=R(i,j+1)+(G(i,j)-\hat{G}^R(i,j+1)); \quad (2.4)$$

Regarding estimation of the green color information for the four directions of blue pixels and estimation of the blue color information for the four directions of green pixels, the color information is obtained in a similar manner by using the two sets of equations mentioned above (e.g., by replacing each R in the equations (2.1)~(2.4) by B).

It should be noted that the above two sets of equations (1.1)~(1.4) and (2.1)~(2.4) are only for describing the process of the color information estimation of the four directions of the target pixel. Hence, these equations are for illustrative purpose only, not limitations of the present invention. The above equations can be replaced by any other appropriate equations as long as the desired green color information of the four directions of the red and blue pixels can be estimated, and the desired red color information and blue color information of the four directions of the green pixels can be estimated.

Figure 4A:
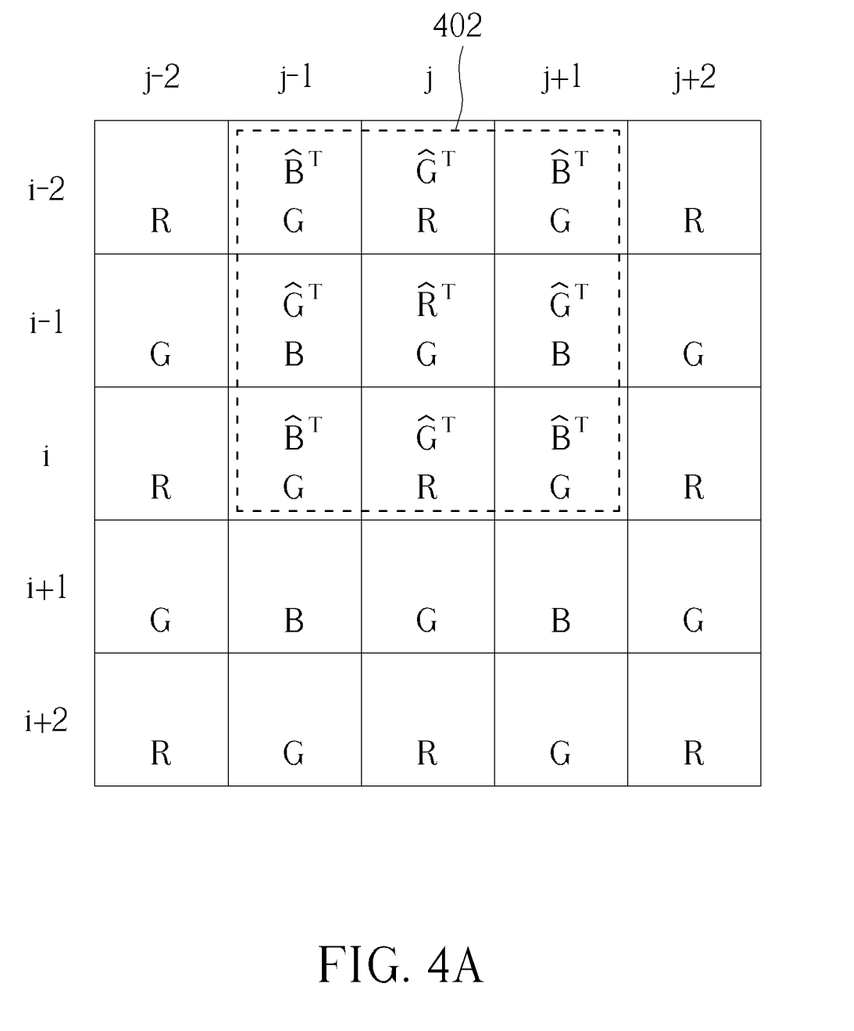
FIG. 4A is a diagram illustrating the computation of the color difference gradient by utilizing the up side mask.
Figure 4B:
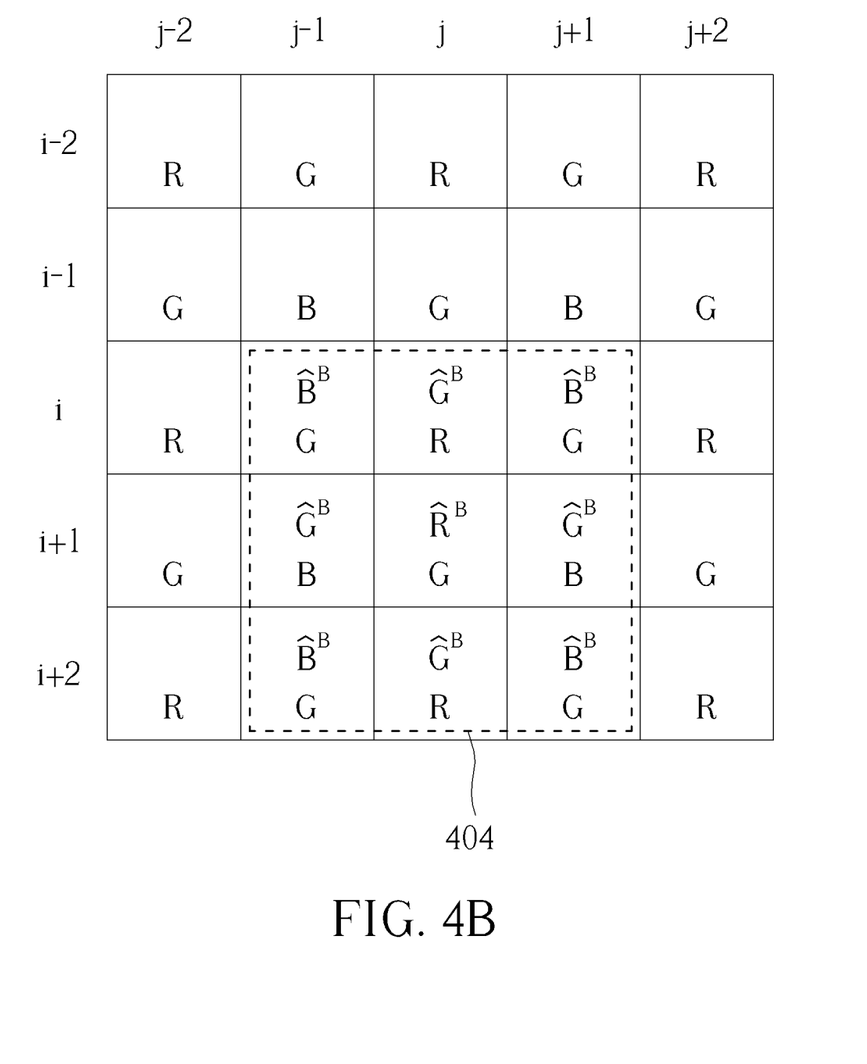
FIG. 4B is a diagram illustrating the computation of the color difference gradient by utilizing the down side mask.
Figure 4C:
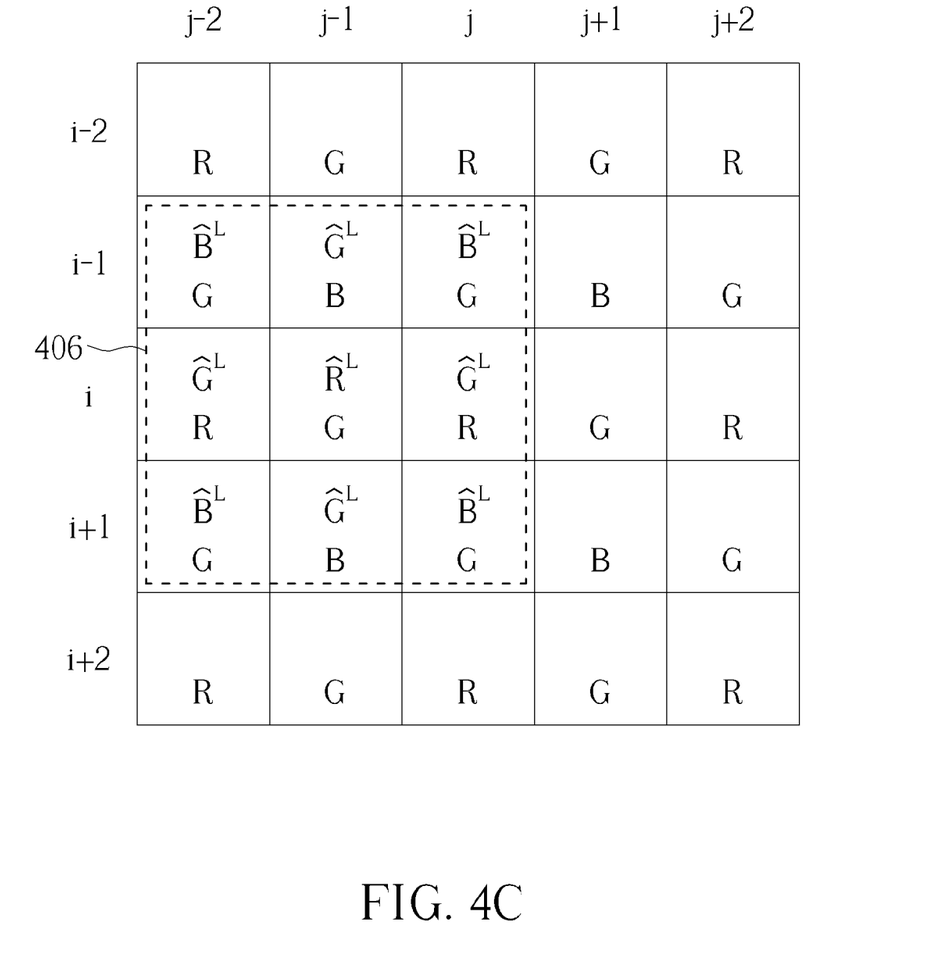
FIG. 4C is a diagram illustrating the computation of the color difference gradient by utilizing the left side mask.
Figure 4D:
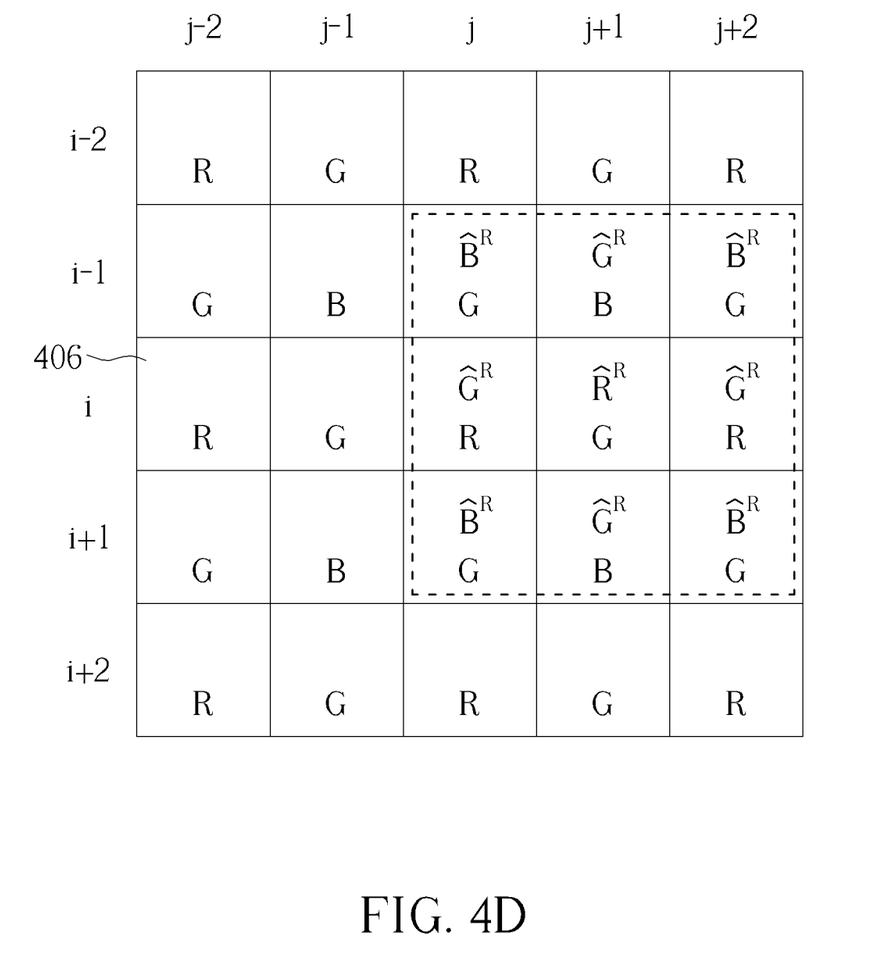
FIG. 4D is a diagram illustrating the computation of the color difference gradient by utilizing the right side mask.

Then, in step 204, the color difference gradient estimating unit 106 would generate color difference gradients of the four directions of the target pixel according to the original pixel color and the estimated color information obtained in step 202. In the natural image, the color difference of pixels within an object (for instance, the pixel value difference between green and red pixels, or the pixel value difference between green and blue pixels) has a smooth characteristic. In other words, the color difference gradient along the edge would be smaller than that cross the edge. Therefore, this can be used to determine the edge and texture characteristics of the target pixel. For details, please refer to FIG. 4A~FIG. 4D, which are diagrams illustrating the computation of the color difference gradient by utilizing the up side, down side, left side and right side masks. Taking the up side mask shown in FIG. 4A for example, $\Delta CD^T(i,j)$ is representative of the up side color difference gradient, and the equation is as follow.

$$\Delta CD^T(i,j) = \sum_{\text{If }(p,q)\text{ is located at the row of green and red}} \left|\hat{C}_r^T(p,q) - \hat{C}_r^T(p-1,q)\right| + \sum_{\text{If }(p,q)\text{ is located at the row of green and blue}} \left|\hat{C}_b^T(p,q) - \hat{C}_b^T(p-1,q)\right| \quad (3)$$

where $(p,q) \in \{(i+m,j+n)|m=0,-1;n=0,\pm1\}$, $\hat{C}_r^T(p,q)$ is representative of the color difference between the green color and the red color at the corresponding position, and $\hat{C}_b^T(p,q)$ is representative of the color difference between the green color and the blue color at the corresponding position. $\hat{C}_r^T(p,q)$ and $\hat{C}_b^T(p,q)$ can be defined as follows: if $(p, q)$ is located at the red pixel, then $\hat{C}_r^T(p,q)=\hat{G}^T(p,q)-R(p,q)$; if $(p, q)$ is located at the green pixel, then $\hat{C}_r^T(p,q)=G(p,q)-\hat{R}^T(p,q)$ and $\hat{C}_b^T(p,q)=G(p,q)-\hat{B}^T(p,q)$ if $(p, q)$ is located at the blue pixel, then $\hat{C}_b^T(p,q)=\hat{G}^T(p,q)-B(p,q)$.

Further, the color difference gradient of the other three directions, that is, the down side color difference gradient $\Delta CD^B(i,j)$, the left side color difference gradient $\Delta CD^L(i,j)$ and the right side color difference gradient $\Delta CD^R(i,j)$, are also obtained through similar equations modified from the above mentioned equations. Since those skilled in the art will readily understand how to obtain the color difference gradient of the other three directions after reading above equations for calculating the color difference gradient $\Delta CD^T(i,j)$, the details are omitted here for brevity.

It should be noted that the above equations for calculating the color difference gradient $\Delta CD^T(i,j)$ are for illustrative purpose only, not limitations of the present invention. For example, if there is a need to further enhance the accuracy, a simple 1×3 low-pass filter may be utilized to perform the filtering processing upon the above-described color difference gradient for reducing the noise interference, or performing a weighted addition or subtraction upon each color difference value of equation (3) to get the up side color difference gradient $\Delta CD^T(i,j)$.

Figure 5:
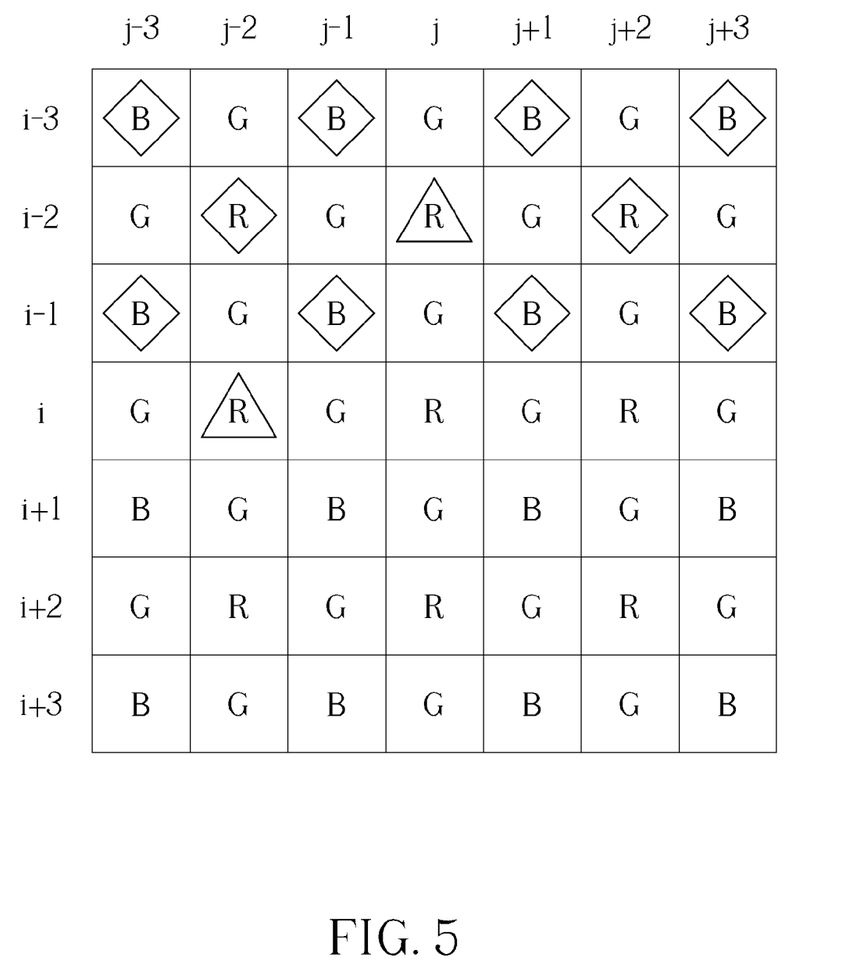
FIG. 5 is a diagram illustrating the operation of obtaining the edge indication factors corresponding to the neighboring pixels.

In step 206, the edge texture characteristic determining unit 108 would obtain edge indication factors corresponding to the neighboring pixels from the frame buffer 120, wherein each edge indication factor is utilized for indicating whether a neighboring pixel is located at a sharp vertical edge, a sharp horizontal edge, or a texture region (i.e., a region having no apparent edge feature). For example, please refer to FIG. 5, which is a diagram illustrating the operation of obtaining the edge indication factors corresponding to the neighboring pixels. As shown in FIG. 5, it is assumed that R(i, j) is the target pixel to be processed currently. Hence, the neighboring pixels whose edge direction factors need to be obtained may include the pixels marked by the triangular and rhombic signs in FIG. 5, wherein the pixels marked by the triangular signs are important pixels with high significance, and the pixels marked by the rhombic signs are normal pixels with normal significance. In addition, in this embodiment, the edge direction factor of each pixel is the least significant bit of the corresponding pixel value stored in the frame buffer. As for the calculation method and the recording method of the edge direction factor, they will be described later in the subsequent step.

Next, in step 208, the edge texture characteristic determining unit 108 would determine the edge texture characteristics of the target pixel in accordance with the up side color difference gradient $\Delta CD^T(i,j)$, the down side color difference gradient $\Delta CD^B(i,j)$, the left side color difference gradient $\Delta CD^L(i,j)$, and the right side color difference gradient $\Delta CD^R(i,j)$ determined in step 204 and the edge indication factors corresponding to the neighboring pixels in step 206. To put it another way, step 208 is to find out if the target pixel is located at the sharp vertical edge, the sharp horizontal edge, or the texture region (i.e., a region having no apparent edge feature). For instance, the following equations may be used for determining the edge texture characteristics.

If the target pixel complies with equation (4.1) below, then the target pixel would be determined to be located at the sharp horizontal edge.

$$\alpha(\Delta CD^L(i,j)+\Delta CD^R(i,j)\times(16-\rho)/16)>(\Delta CD^T(i,j)+\Delta CD^B(i,j)+\Delta CD^{CV}(i,j)\times\rho/16) \quad (4.1)$$

If the target pixel complies with equation (4.2) below, then the target pixel would be determined to be located at the sharp vertical edge.

$$(\Delta CD^L(i,j)+\Delta CD^R(i,j)+\Delta CD^{CH}(i,j)\times(16-\rho)/16)<\alpha(\Delta CD^T(i,j)+\Delta CD^B(i,j)+\Delta CD^{CV}(i,j)\times\rho/16) \quad (4.2)$$

If the target pixel does not comply with either the equation (4.1) or the equation (4.2), then the target pixel would be determined to be located at the texture region.

In above equation (4.1) or (4.2), $\alpha$ is a scaling factor for controlling the size of the set of the horizontal and vertical edges and the texture feature, $\Delta CD^{CV}(i,j)=|\overline{G}^T(i,j)-R(i,j)-\overline{G}^B(i,j)-R(i,j)|$ (which may be simplified as $\Delta CD^{CV}(i,j)=$ $|\bar{G}^T(i,j)-\bar{G}^B(i,j)|$), $\Delta CD^{CH}(i,j)=|\bar{G}^L(i,j)-R(i,j)-\bar{G}^R(i,j)-R(i,j)|$ (which may be simplified as $\Delta CD^{CH}(i,j)=|\bar{G}^L(i,j)-\bar{G}^R(i,j)|$), and ρ is calculated in accordance with the edge indication factors corresponding to the neighboring pixels obtained in step 206.

Regarding computation of ρ, the edge indication factor of each pixel is the least significant bit of the corresponding pixel value stored in the frame buffer. Suppose that the edge indication factor "0" is representative of the pixel being located at the sharp vertical edge, and the edge indication factor "1" is representative of the pixel being located at the sharp horizontal edge. As shown in FIG. 5, if the edge indication factor of one representative neighboring pixel marked by a triangular sign is "1", the value of p would be added by 3 (i.e., ρ=ρ+3); if the edge indication factor of one normal neighboring pixel marked by a rhombus sign is "1", the value of ρ would be added by 1 (i.e., ρ=ρ+1); if the edge indication factor of one neighboring pixel is "0", the value of ρ would be remained. That is to say, ρ could be obtained through converting the edge indication factors of the neighboring pixels shown in FIG. 5 to the corresponding values and then accumulating these values.

After determining the target pixel is located at the sharp vertical edge, the sharp horizontal edge, or the texture region, the flow would proceed with step 210 to determine the edge indication factor of the target pixel, where the edge indication factor would be embedded in the pixel value of the target pixel stored in the frame buffer by the edge indication factor recording unit 110. In details, when the target pixel is determined to be located at the sharp vertical edge, the least significant bit (LSB) of the binary value of the original color information of the target pixel stored in the frame buffer would be checked. If the checked LSB is not 0, then the LSB would be added or subtracted by 1; on the other hand, if the checked LSB is 0, then the LSB would be remained. Similarly, when the target pixel is determined to be located at the sharp horizontal edge, the LSB of the binary value of the original color information of the target pixel stored in the frame buffer would be checked. If the checked LSB is not 1, then the LSB would be added or subtracted by 1; on the other hand, if the checked LSB is 1, then the LSB would be remained. For a 10-bit binary value of the original color information of the target pixel, the change of the least significant bit is not easily noticed by human eyes. Therefore, utilizing this method can record these helpful information for image characteristic determination (e.g., the information may be referenced in step 206), without requiring extra buffer memory.

Then, after determining the target pixel is located at the sharp vertical edge, the sharp horizontal edge, or the texture region, we can use the interpolation methodology in one of the following equations (5.1)~(5.3) to reconstruct the missing color information (the following describes reconstruction of the green color information for the red color pixel by interpolation).

If the target pixel is located at the sharp vertical edge, then equation (5.1) below would be utilized for reconstructing the miss color information (the target color information).

$$\hat{G}(i,j)=(W^T(i,j)\times\hat{G}^T(i,j)+W^B(i,j)\times\hat{G}^B(i,j)) \quad (5.1)$$

If the target pixel is located at the sharp horizontal edge, then equation (5.2) below would be utilized for reconstructing the miss color information.

$$\hat{G}(i,j)=(W^L(i,j)\times\hat{G}^L(i,j)+W^R(i,j)\times\hat{G}^R(i,j)) \quad (5.2)$$

If the target pixel is located at the texture region, then equation (5.3) below would be utilized for reconstructing the miss color information.

$$\hat{G}(i,j)=(W^T(i,j)\times\hat{G}^T(i,j)+W^B(i,j)\times\hat{G}^B(i,j)+W^L(i,j)\times\hat{G}^L(i,j)+W^R(i,j)\times\hat{G}^R(i,j)) \quad (5.3)$$

In order to determine each weighting factors desired in the above equations (5.1)~(5.3), in step 212, the dynamic weighting factor quantization allocating unit 112 would allocate the weighting factors for two or four directions in accordance with the up side) color difference gradient $\Delta CD^T(i,j)$, the down side color difference gradient $\Delta CD^B(i,j)$, the left side color difference gradient $\Delta CD^L(i,j)$, and the right side color difference gradient $\Delta CD^R(i,j)$ by referring to a look-up table for obtaining the corresponding quantized values. For instance, if the target pixel is located at the sharp vertical edge, then Table 1 below can be utilized for determining the weighting factors $W^T(i,j)$ and $W^B(i,j)$.

TABLE 1

| Comparison rules | quantization allocation |
| --- | --- |
| $\Delta CD^T(i,j) \le 0.25 * \Delta CD^B(i,j)$ | $W^T(i,j) = 7/8, W^B(i,j) = 1/8$ |
| $0.25 * \Delta CD^B(i,j) < \Delta CD^T(i,j) \le 0.5 * \Delta CD^B(i,j)$ | $W^T(i,j) = 6/8, W^B(i,j) = 2/8$ |
| $0.5 * \Delta CD^B(i,j) < \Delta CD^T(i,j) \le 0.75 * \Delta CD^B(i,j)$ | $W^T(i,j) = 5/8, W^B(i,j) = 3/8$ |
| $0.75 * \Delta CD^B(i,j) < \Delta CD^T(i,j) \le \Delta CD^B(i,j)$ or $0.75 * \Delta CD^T(i,j) < \Delta CD^B(i,j) \le \Delta CD^T(i,j)$ | $W^T(i,j) = 4/8, W^B(i,j) = 4/8$ |
| $0.5 * \Delta CD^T(i,j) < \Delta CD^B(i,j) \le 0.75 * \Delta CD^T(i,j)$ | $W^B(i,j) = 5/8, W^T(i,j) = 3/8$ |
| $0.25 * \Delta CD^T(i,j) < \Delta CD^B(i,j) \le 0.5 * \Delta CD^T(i,j)$ | $W^B(i,j) = 6/8, W^T(i,j) = 2/8$ |
| $\Delta CD^B(i,j) \le 0.25 * \Delta CD^T(i,j)$ | $W^B(i,j) = 7/8, W^T(i,j) = 1/8$ |

If the target pixel is located at the sharp horizontal edge, then Table 2 below can be utilized for determining the weighting factors $W^L(i,j)$ and $W^R(i,j)$.

TABLE 2

| Comparison rules | quantization allocation |
| --- | --- |
| $\Delta CD^L(i,j) \le 0.25 * \Delta CD^R(i,j)$ | $W^L(i,j) = 7/8, W^R(i,j) = 1/8$ |
| $0.25 * \Delta CD^R(i,j) < \Delta CD^L(i,j) \le 0.5 * \Delta CD^R(i,j)$ | $W^L(i,j) = 6/8, W^R(i,j) = 2/8$ |
| $0.5 * \Delta CD^R(i,j) < \Delta CD^L(i,j) \le 0.75 * \Delta CD^R(i,j)$ | $W^L(i,j) = 5/8, W^R(i,j) = 3/8$ |
| $0.75 * \Delta CD^R(i,j) < \Delta CD^L(i,j) \le \Delta CD^R(i,j)$ or $0.75 * \Delta CD^L(i,j) < \Delta CD^R(i,j) \le \Delta CD^L(i,j)$ | $W^L(i,j) = 4/8, W^R(i,j) = 4/8$ |
| $0.5 * \Delta CD^L(i,j) < \Delta CD^R(i,j) \le 0.75 * \Delta CD^L(i,j)$ | $W^R(i,j) = 5/8, W^L(i,j) = 3/8$ |
| $0.25 * \Delta CD^L(i,j) < \Delta CD^R(i,j) \le 0.5 * \Delta CD^L(i,j)$ | $W^R(i,j) = 6/8, W^L(i,j) = 2/8$ |
| $\Delta CD^R(i,j) \le 0.25 * \Delta CD^L(i,j)$ | $W^R(i,j) = 7/8, W^L(i,j) = 1/8$ |

If the target pixel is located at the texture region, then Table 3 below can be utilized for determining the weighting factors $W^T(i,j)$, $W^B(i,j)$, $W^L(i,j)$ and $W^R(i,j)$.

TABLE 3

($\Delta X(i, j) < \Delta Y(i, j)$)

| Comparison rules | quantization allocation |
| --- | --- |
| $\Delta X(i, j) \le 0.25 * \Delta Y(i, j)$ | $W^X(i, j) = 21/32, W^Y(i, j) = 3/32$ |
| $0.25 * \Delta Y(i, j) < \Delta X(i, j) \le 0.5 * \Delta Y(i, j)$ | $W^X(i, j) = 18/32, W^Y(i, j) = 6/32$ |
| $0.5 * \Delta Y(i, j) < \Delta X(i, j) \le 0.75 * \Delta Y(i, j)$ | $W^X(i, j) = 15/32, W^Y(i, j) = 9/32$ |
| $0.75 * \Delta Y(i, j) < \Delta X(i, j) \le \Delta Y(i, j)$ | $W^X(i, j) = 12/32, W^Y(i, j) = 12/32$ |

$\Delta Y(i,j)$ shown in Table 3 is the largest color difference gradient among the up side color difference gradient $\Delta CD^T(i,j)$, the down side color difference gradient $\Delta CD^B(i,j)$, the left side color difference gradient $\Delta CD^L(i,j)$, and the right side color difference gradient $\Delta CD^R(i,j)$; and $\Delta X(i,j)$ shown in Table 3 is the second largest color difference gradient. That is to say, supposing the relationship between the color difference gradients of for directions of the target pixel is $\Delta CD^T(i,j) > \Delta CD^L(i,j) > \Delta CD^B(i,j) > \Delta CD^R(i,j)$ and $\Delta CD^L(i,j) \le 0.25 * \Delta CD^T(i,j)$, $W^T(i,j)$ would be set to (21/32), $W^L(i,j)$ would be set to (3/32), and the other two weighting factors $W^B(i,j)$ and $W^R(i,j)$ would share the remaining (8/32).

It should be noted that Table 1-Table 3 are examples for illustrating how to determine aforementioned weighting factors, and are not mean to be limitations of the present invention. The comparison rules and weighting factors defined in quantization allocation may be adjusted based on design requirements as long as weighting factors of each direction can be determined according to the color difference gradients.

After determining the desired weighting factors, the weighted interpolation unit 114 would utilize one of the above equations (5.1)~(5.3) to perform the weighted interpolation in step 214 to reconstruct the missing color information. After all of the above steps are finished, the reconstructed green color information retains more image details, and the computation thereof requires no division operation and extra buffer memory.

Besides, in step 214, after the green color information of the red pixel (or blue pixel) is reconstructed, the weighted interpolation unit 114 would further utilize the reconstructed green color information to reconstruct the red color and blue color information of the neighboring pixels. In other words, the reconstructed green color information can be utilized to reconstruct the red or blue color information of the other green color pixels, or the reconstructed green color information can be utilized to reconstruct the blue color information of the other red color pixels, or the reconstructed green color information can further be utilized to reconstruct the red color information of the other blue color pixels. In details, the equation (6.1) or (6.2) below can be utilized to reconstruct the red color information of the green color pixels based on the reconstructed green color information.

If (i, j) is located at the row having the green color and the red color, the following equation is used:

$$\hat{R}(i,j) = G(i,j) - \frac{1}{2}(\hat{G}(i,j-1) - R(i,j-1) + \hat{G}(i,j+1) - R(i,j+1)) \quad (6.1)$$

If (i, j) is located at the row having the blue color and the green color, the following equation is used:

$$\hat{R}(i,j) = G(i,j) - \frac{1}{2}(\hat{G}(i-1,j) - R(i-1,j) + \hat{G}(i+1,j) - R(i+1,j)) \quad (6.2)$$

Moreover, the equations (6.3) below can be utilized to reconstruct the red color information of the blue color pixels based on the reconstructed green color information.

$$\hat{R}(i, j) = \hat{G}(i, j) + \frac{1}{4} \sum_{m=\pm 1} \sum_{n=\pm 1} \left( R(i+m, j+n) - \hat{G}(i+m, j+n) \right) \quad (6.3)$$

The above is related to reconstructing the red color information of the green and blue color pixels based on the reconstructed green color information. Since the equations of reconstructing the blue color information of the green and red color pixels is similar to the above equations, those skilled in the art should readily understand how to reconstruct the blue color information after applying slight modifications to the above equations. Therefore, the details are omitted here for brevity.

In step 214, the reconstruction processes of red color information and blue color information can be performed simultaneously for reducing the execution time; furthermore, the image quality as well as overall performance are enhanced due to the fact that step 214 uses the green color information with higher accuracy for construction of the red and blue color information.

Finally, the flow ends in step 216. The reconstructed color information is generated from the weighted interpolation unit 114 to the following processing unit, and then displayed on a display screen.

Figure 6:
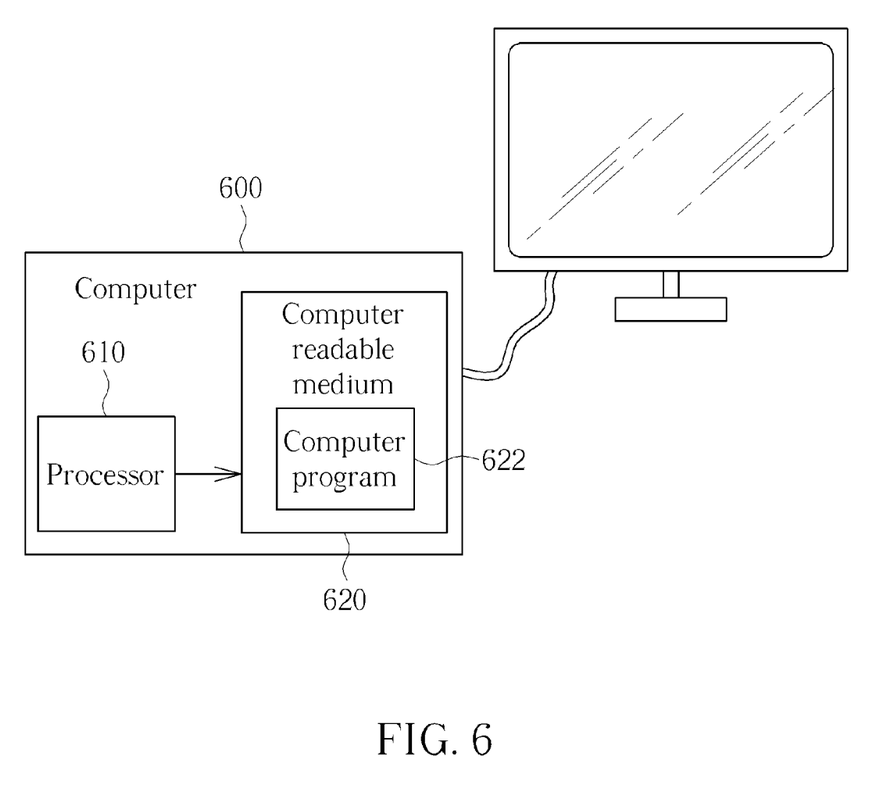
FIG. 6 is a diagram illustrating a computer readable medium according to an embodiment of the present invention.

Besides, although the image processing apparatus 100 shown in FIG. 1 is implemented by hardware circuitry, the flow of the image processing method shown in FIG. 2 may also be implemented using software. Please refer to FIG. 6 for the details, in which a computer 600 includes at least a processor 610 and a computer readable medium 620, wherein the computer readable medium 620 may be a hard disk or other storage device, and the computer readable medium 620 has a computer program 622 stored therein. When the processor 610 executes the computer program 622, the computer 600 would execute the steps shown in FIG. 2.

In the prior art, the operation of the pixel color interpolation is usually performed by utilizing weighting factors of each edge directions; however, these conventional methodologies usually need considerable division operations and complicated algorithms for deriving the weighting factors, thus increasing the hardware cost inevitably. According the disclosed embodiments of the present invention, the proposed image processing apparatus and image processing method may take advantages from the adaptive edge weighting method under the condition where no division operation but just simple look-up table is used. In addition, in order to improve the processing performance of the slight edge structures which are more easily noticed by human eyes, a method for recording the edge indication factor without extra buffer memory is disclosed in an embodiment of the present invention. This method is accomplished by replacing the least significant bit (LSB) of the original color information of the target pixel by the edge indication factor. In this way, the accuracy of determining the edge feature of the target pixel can be improved by referring the previous edge determination results of the neighboring pixels during the step of determining the direction of the edge feature.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing apparatus, comprising:
   an initial interpolation unit, arranged for receiving image data from a frame buffer, wherein each pixel of the image data has only one color information, and for a target pixel of the image data, the initial interpolation unit estimates four second color information corresponding to up, down, left and right sides of the target pixel respectively according to first color information of the target pixel and color information of neighboring pixels, where a color to which the first color information corresponds is different from colors to which the four second color information corresponds;
   a color difference gradient estimating unit, coupled to the initial interpolation unit, the color difference gradient estimating unit arranged for calculating four color difference gradients corresponding to the up, down, left, and right sides of the target pixel respectively according to the four second color information of the target pixel;
   an edge texture characteristic determining unit, coupled to the color difference gradient estimating unit, the edge texture characteristic determining unit arranged for determining an edge texture characteristic of the target pixel according to the four color difference gradients of the target pixel; and
   an edge indication factor recording unit, coupled to the edge texture characteristic determining unit, the edge indication factor recording unit arranged for determining whether to modify a bit value of the first color information of the target pixel that is stored in a frame buffer according to the edge texture characteristic of the target pixel.

2. The image processing apparatus of claim 1, wherein the image data is a Bayer color filter array (CFA) image.

3. The image processing apparatus of claim 1, wherein the edge texture characteristic determining unit determines the edge texture characteristic of the target pixel according to the four color difference gradients of the target pixel and an edge indication factor of at least one neighboring pixel.

4. The image processing apparatus of claim 3, wherein the edge indication factor of the at least one neighboring pixel is a bit value of a least significant bit of color information of the at least one neighboring pixel stored in the frame buffer.

5. The image processing apparatus of claim 1, wherein the edge indication factor recording unit determines whether to modify the bit value of a least significant bit of the first color information of the target pixel stored in the frame buffer according to the edge texture characteristic of the target pixel.

6. The image processing apparatus of claim 1, wherein the edge texture characteristic determining unit determines whether the target pixel is located at a sharp vertical edge, a sharp horizontal edge, or a texture region according to the four color difference gradients of the target pixel.

7. The image processing apparatus of claim 6, wherein when the target pixel is located at the sharp vertical edge, the edge indication factor recording unit determines the bit value of the least significant bit of the first color information of the target pixel in the frame buffer to be one of "1" and "0"; when the target pixel is located at the sharp horizontal edge, the edge indication factor recording unit determines the bit value of the least significant bit of the first color information of the target pixel in the frame buffer to be another of "1" and "0"; and when the target pixel is located at the texture region, the edge indication factor recording unit does not modify the bit value of the least significant bit of the first color information of the target pixel in the frame buffer.

8. The image processing apparatus of claim 1, further comprising:
   a dynamic weighting factor quantization allocating unit, coupled to the color difference gradient estimating unit and the edge texture characteristic determining unit, the dynamic weighting factor quantization allocating unit arranged for determining a plurality of weighing factors according to the four color difference gradients of the target pixel and the edge texture characteristic of the target pixel by using a look-up table; and
   a weighted interpolation unit, coupled to the initial interpolation unit and the dynamic weighting factor quantization allocating unit, the weighted interpolation unit arranged for performing a weighting addition upon at least two of the four second color information of the target pixel by using the weighting factors, and accordingly generating one target second color information of the target pixel.

9. An image processing method, comprising:
   receiving image data from a frame buffer, wherein each pixel of the image data has only one color information;
   for a target pixel of the image data, estimating four second color information corresponding to up, down, left, and right sides of the target pixel respectively according to first color information of the target pixel and color information of neighboring pixels, wherein a color to which the first color information corresponds is different from colors to which the four second color information corresponds;
   calculating four color difference gradients corresponding to the up, down, left, and right sides of the target pixel respectively according to the four second color information of the target pixel;
   utilizing an edge texture characteristic determining unit of an image processing apparatus to determine an edge texture characteristic of the target pixel according to the four color difference gradients of the target pixel; and
   utilizing an edge indication factor recording unit of the image processing apparatus to determine whether to modify a bit value of the first color information of the target pixel that is stored in a frame buffer according to the edge texture characteristic of the target pixel.

10. The image processing method of claim 9, wherein the image data is a Bayer color filter array (CFA) Image.

11. The image processing method of claim 9, wherein the step of determining the edge texture characteristic of the target pixel comprises:
    determining the edge texture characteristic of the target pixel according to the four color difference gradients of the target pixel and an edge indication factor of at least one neighboring pixel.

12. The image processing method of claim 11, wherein the edge indication factor of the at least one neighboring pixel is a bit value of a least significant bit of color information of the at least one neighboring pixel stored in the frame buffer.

13. The image processing method of claim 9, wherein the step of determining whether to modify the bit value of the first color information of the target pixel stored in the frame buffer according to the edge texture characteristic of the target pixel comprises:
    determining whether to modify the bit value of a least significant bit of the first color information of the target pixel stored in the frame buffer according to the edge texture characteristic of the target pixel.

14. The image processing method of claim 9, wherein the step of determining the edge texture characteristic of the target pixel comprises:

determining whether the target pixel is located at a sharp vertical edge, a sharp horizontal edge, or a texture region according to the four color difference gradients of the target pixel.

15. The image processing method of claim 14, wherein the step of determining whether to modify the bit value of the first color information of the target pixel stored in the frame buffer according to the edge texture characteristic of the target pixel comprises:

when the target pixel is located at the sharp vertical edge, determining the bit value of the least significant bit of the first color information of the target pixel of the frame buffer to be one of "1" and "0";

when the target pixel is located at the sharp horizontal edge, determining the bit value of the least significant bit of the first color information of the target pixel of the frame buffer to be another of "1" and "0"; and when the target pixel is located at the texture region, not modifying the bit value of the least significant bit of the first color information of the target pixel of the frame buffer.

16. The image processing method of claim 9, further comprising:

determining a plurality of weighing factors according to the four color difference gradients of the target pixel and the edge texture characteristic of the target pixel by using a look-up table; and performing a weighting addition upon at least two of the four second color information of the target pixel by using the weighting factors, and accordingly generating one target second color information of the target pixel.

17. An image processing apparatus, comprising:

an initial interpolation unit, arranged for receiving image data from a frame buffer, wherein each pixel of the image data has only one color information, and for a target pixel of the image data, the initial interpolation unit estimates four second color information corresponding to up, down, left and right sides of the target pixel respectively according to first color information of the target pixel and color information of neighboring pixels, where a color to which the first color information corresponds is different from colors to which the four second color information corresponds;

a color difference gradient estimating unit, coupled to the initial interpolation unit, the color difference gradient estimating unit arranged for calculating four color difference gradients corresponding to the up, down, left and right sides of the target pixel respectively according to the four second color information of the target pixel;

an edge texture characteristic determining unit, coupled to the color difference gradient estimating unit, the edge texture characteristic determining unit arranged for determining an edge texture characteristic of the target pixel according to the four color difference gradients of the target pixel;

a dynamic weighting factor quantization allocating unit, coupled to the color difference gradient estimating unit and the edge texture characteristic determining unit, the dynamic weighting factor quantization allocating unit arranged for determining a plurality of weighing factors according to the four color difference gradients of the target pixel and the edge texture characteristic of the target pixel by using a look-up table; and a weighted interpolation unit, coupled to the initial interpolation unit and the dynamic weighting factor quantization allocating unit, the weighted interpolation unit arranged for performing a weighting addition upon at least two of the four second color information of the target pixel by using the weighting factors and accordingly generating one target second color information of the target pixel.

18. The image processing apparatus of claim 17, wherein the image data is a Bayer color filter array (CFA) image.

19. An image processing method, comprising:

receiving image data from a frame buffer, wherein each pixel of the image data has only one color information;

for a target pixel of the image data, estimating four second color information corresponding to up, down, left and right sides of the target pixel respectively according to first color information of the target pixel and color information of neighboring pixels, wherein a color to which the first color information corresponds is different from colors to which the four second color information corresponds;

calculating four color difference gradients corresponding to the up, down, left and right sides of the target pixel respectively according to the four second color information of the target pixel;

utilizing an edge texture characteristic determining unit of an image processing apparatus to determine an edge texture characteristic of the target pixel according to the four color difference gradients of the target pixel;

utilizing a dynamic weighting factor quantization allocating unit of the image processing apparatus to determine a plurality of weighing factors according to the four color difference gradients of the target pixel and the edge texture characteristic of the target pixel by using a look-up table; and utilizing a weighted interpolation unit of the image processing apparatus to perform a weighting addition upon at least two of the four second color information of the target pixel by using the weighting factors, and accordingly generating one target second color information of the target pixel.

20. The image processing method of claim 19, wherein the image data is a Bayer color filter array (CFA) image.

* * * * *